(12) United States Patent
Waseda et al.

(10) Patent No.: US 11,605,809 B2
(45) Date of Patent: Mar. 14, 2023

(54) ANODE ACTIVE MATERIAL AND BATTERY

(71) Applicant: TOYOTA JIDOSHA KABUSHIKI KAISHA, Toyota (JP)

(72) Inventors: Tetsuya Waseda, Susono (JP); Satoshi Wakasugi, Susono (JP); Jun Yoshida, Mishima (JP); Masaki Adachi, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 139 days.

(21) Appl. No.: 16/952,842

(22) Filed: Nov. 19, 2020

(65) Prior Publication Data
US 2021/0175493 A1 Jun. 10, 2021

(30) Foreign Application Priority Data

Dec. 9, 2019 (JP) .............................. JP2019-222286
Mar. 23, 2020 (JP) .............................. JP2020-051600

(51) Int. Cl.
*H01M 4/36* (2006.01)
*H01M 4/38* (2006.01)
*H01M 4/58* (2010.01)
*H01M 10/0525* (2010.01)
*H01M 4/02* (2006.01)

(52) U.S. Cl.
CPC ........... *H01M 4/364* (2013.01); *H01M 4/386* (2013.01); *H01M 4/58* (2013.01); *H01M 10/0525* (2013.01); *H01M 2004/021* (2013.01); *H01M 2004/027* (2013.01); *H01M 2220/20* (2013.01)

(58) Field of Classification Search
CPC ....... H01M 10/0525; H01M 2004/021; H01M 2004/027; H01M 2220/20; H01M 4/0488; H01M 4/364; H01M 4/386; H01M 4/58; H01M 4/624; Y02E 60/10
See application file for complete search history.

(56) References Cited

U.S. PATENT DOCUMENTS

2014/0234721 A1 8/2014 Yang et al.
2015/0380733 A1 12/2015 Lee et al.
2016/0181598 A1 6/2016 Suh et al.

FOREIGN PATENT DOCUMENTS

| CN | 109987607 A | 7/2019 |
| JP | 2004-356054 A | 12/2004 |
| JP | 2012-084522 A | 4/2012 |
| JP | 2013-203626 A | 10/2013 |
| JP | 2013-235682 A | 11/2013 |
| JP | 2015-095301 A | 5/2015 |

(Continued)

OTHER PUBLICATIONS

"A Basic Guide to Particle Characterization," Malvern Instruments Worldwide—White Paper, May 2, 2021, pp. 1-26 XP055089322 Retrieved from the Internet: http:i/golik.co.il/Data/ABasicGuidtoParticleCharacterization(2)_1962085150.pdf.

(Continued)

*Primary Examiner* — Victoria H Lynch
(74) *Attorney, Agent, or Firm* — Oliff PLC

(57) ABSTRACT

A main object of the present disclosure is to provide an anode active material whose volume variation due to charging and discharging is small. The present disclosure achieves the object by providing an anode active material comprising a primary particle including a Si phase, an MSi phase that is a silicide phase wherein M is a transition metal element, and a first void.

7 Claims, 2 Drawing Sheets

(56) References Cited

FOREIGN PATENT DOCUMENTS

| JP | 2016-504722 A | 2/2016 |
| KR | 10-2016-0076950 A | 7/2016 |
| WO | 2017/091543 A1 | 6/2017 |

OTHER PUBLICATIONS

Kang et al., "Nanostructured Silicon/Silicide/Carbon Composite Anodes with Controllable Voids for Li-ion Batteries," Materials and Design, vol. 120, 2017, pp. 230-237.

ANODE ACTIVE MATERIAL AND BATTERY

TECHNICAL FIELD

The present disclosure relates to an anode active material and a battery.

BACKGROUND ART

In recent years, the development of batteries has been actively undergone. For example, in automobile industries, the development of a battery to be utilized for an electronic vehicle or a hybrid vehicle has been advanced. Also, as an active material used in the battery, a Si particle has been known.

As an anode active material, for example, Patent Literature 1 discloses a porous silicon particle having a void. As an anode active material, Patent Literature 2 discloses a particle wherein a Si phase is dispersed in a silicide phase. As an anode active material, Patent Literature 3 discloses a composite particle including a particle composed of a Si phase, and a particle composed of a silicide phase.

CITATION LIST

Patent Literatures

Patent Literature 1: Japanese Patent Application Laid-Open (JP-A) No. 2013-203626
Patent Literature 2: JP-A No. 2015-095301
Patent Literature 3: JP-A No. 2013-235682

SUMMARY OF DISCLOSURE

Technical Problem

The theoretical capacity of Si particle is high, which is advantageous in high energy condensation of a battery. On the other hand, the volume variation of the Si particle during charge and discharge is large.

The present disclosure has been made in view of the above circumstances, and a main object thereof is to provide an anode active material whose volume variation due to charging and discharging is small.

Solution to Problem

In order to achieve the object, the present disclosure provides an anode active material comprising a primary particle including a Si phase, an MSi phase that is a silicide phase wherein M is a transition metal element, and a first void.

According to the present disclosure, since the primary particle includes a Si phase, an MSi phase that is a silicide phase, and a first void, an anode active material whose volume variation due to charging and discharging is small, may be obtained.

In the disclosure, a ratio of the transition metal element to a sum of a Si element and the transition metal element included in the primary particle may be 2 mol % or more and less than 50 mol %.

In the disclosure, a ratio of the first void in the primary particle may be 3% or more.

In the disclosure, the transition metal element may be at least one kind of W, Mo, Cr, V, Nb, Fe, Ti, Zr, Hf, and Os.

In the disclosure, the transition metal element may be at least one kind of Cr, Ti, Zr, Hf, and Os.

In the disclosure, the anode active material may be an aggregate of a plurality of the primary particles, and may be a secondary particle including a second void.

The present disclosure also provides a battery comprising a cathode active material layer, an anode active material layer, and an electrolyte layer formed between the cathode active material layer and the anode active material layer, and the anode active material layer includes the above described anode active material.

According to the present disclosure, since the anode active material layer includes the above described anode active material, the confining pressure of a battery may be suppressed from being increased by charging and discharging.

Also, in the disclosure, the anode active material layer of the battery may include the anode active material, and when a thickness of the anode active material layer in a stacked direction is α μm, and an average particle size of the secondary particle is β μm, β/α may be 0.02 or more and 0.5 or less.

According to the present disclosure, since the thickness of the anode active material layer in a stacked direction and the average particle size of the secondary particle are in a predetermined relation, the confining pressure of a battery may be suppressed from being increased by charging and discharging.

Advantageous Effects of Disclosure

The present disclosure exhibits an effect that an anode active material whose volume variation due to charging and discharging is small, may be obtained.

DESCRIPTION OF EMBODIMENTS

Figure 1:
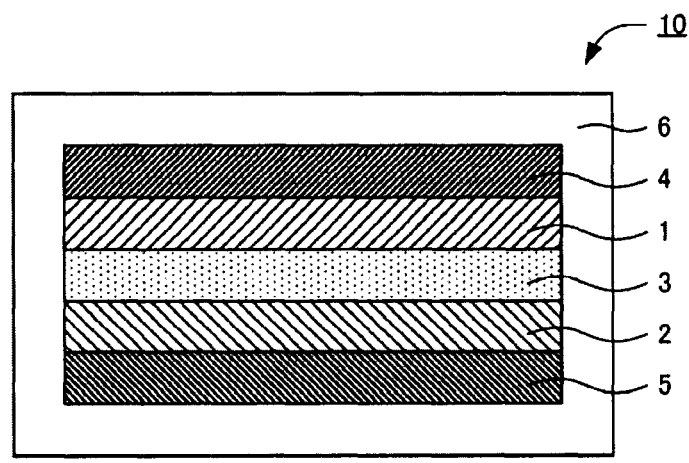
FIG. 1 is a schematic cross-sectional view showing an example of the battery in the present disclosure.

An anode active material and a battery in the present disclosure will be hereinafter described in detail.

A. Anode Active Material

The anode active material in the present disclosure comprise a primary particle including a Si phase, an MSi phase that is a silicide phase wherein M is a transition metal element, and a first void.

According to the present disclosure, since the primary particle includes a Si phase, an MSi phase that is a silicide phase, and a first void, an anode active material whose volume variation due to charging and discharging is small, may be obtained.

A high energy density is required for a battery. Therefore, the use of a Si material having excellent capacitance property, as an active material has been investigated. However, when a Si material having a diamond-type crystal structure is used, particularly in an all solid state battery, cracks may occur inside the electrode during repeated charging and discharging, and the life of the battery may be shortened. Also, since large stress is applied to the confining component of the battery in the charged condition, it is necessary to adopt a highly rigid confining structure, which may increase the size of the confining jig. As the result, the energy density of the entire battery may be reduced. Therefore, various studies have been made on suppressing expansion of the Si material due to charging and discharging.

For example, Patent Document 1 discloses a Si particle having a void therein, and Patent Document 3 discloses a composite particle having a void between primary particles. However, there is a possibility that these voids are collapsed by the pressing pressure at the time of electrode manufacturing so that there is a margin for improvement in the suppression of expansion of the Si particle. Patent Document 2 discloses particles in which a Si phase is dispersed in a silicide phase, but cracks may occur at the interface between the silicide phase and the Si phase at the time of charging so that there is a margin for improvement in suppressing expansion of the Si particle.

Meanwhile, in the anode active material in the present disclosure, the primary particle includes a Si phase, an MSi phase that is a silicide phase, and a first void. As the result, even if pressed at the time of electrode manufacturing, the silicide phase functions as a pillar, and the first void may be maintained. As the result, it is possible to suppress the expansion of the Si particle. In general, when the primary particle includes a void (first void), the resistance tends to increase. However, since the silicide phase has an electron conductivity, it is possible to suppress an increase in resistance even if it includes the first void.

1. Primary Particle

The primary particle in the present disclosure includes a Si phase, an MSi phase that is a silicide phase, and a first void.

(1) Si Phase

The primary particle in the present disclosure includes a Si phase. The Si phase is a phase of a simple substance of Si.

The area ratio (%) of the Si phase in the primary particle may be, for example, 30% or more, may be 40% or more, and may be 50% or more. Meanwhile, the area ratio of the Si phase is, for example, 90% or less, may be 80% or less, and may be 70% or less. The area ratio of the Si phase may be smaller, the same, or larger than the area ratio of the MSi phase described later, and it is preferable that the area ratio of the Si phase is larger, from the viewpoint of capacitance.

The area ratio of the Si phase may be determined by, for example, SEM (scanning electron microscope) observation. The cross-section of the anode active material is observed with SEM to obtain photographs of the particle. Using image analysis software, the Si phase is steeply separated to determine the area from the obtained photograph. Then, the area ratio (%) is calculated from the following formula. The number of samples is preferably large, and is, for example, 20 or more, may be 30 or more, may be 50 or more, and may be 100 or more.

$$\text{Area ratio (\%)}=100\times(\text{Si phase area})/(\text{primary particle area})$$

(2) MSi Phase

The primary particle in the present disclosure includes an MSi phase. The MSi phase is a silicide phase, and M is a transition metal element described later. Also, the ratio of M (transition metal element) and Si (Si element) in the MSi phase is not particularly limited as long as it is a ratio capable of forming a silicide.

The transition metal element M in the MSi phase is preferably at least one kind of, W, Mo, Cr, V, Nb, Fe, Ti, Zr, Hf and Os. Among these elements, at least one kind of Cr, Ti, Zr, Hf, and Os is particularly preferable. The transition metal element M in the MSi phase may be only one kind, and may be two kinds or more of the above elements.

The ratio of the transition metal element M is, for example, 2 mol % or more, may be 5 mol % or more, may be 10 mol % or more, and may be 20 mol % or more, based on the sum of the Si element and transition metal element M included in the primary particle. Meanwhile, the ratio of transition metal element M is, for example, less than 50 mol %, may be 40 mol % or less, and may be 30 mol % or less. Incidentally, "Si element included in the primary particle" includes both Si element in the Si phase and Si element in the MSi phase. The ratio of the transition metal element M may be confirmed by, for example, high-frequency inductively coupled plasma (ICP) emission spectroscopy.

The area ratio (%) of the MSi phase in the primary particle is, for example, 5% or more, may be 10% or more, and may be 20% or more. Meanwhile, the area ratio of the MSi phase is, for example, 60% or less, may be 50% or less, and may be 40% or less. The area ratio of the MSi phase may be obtained from the following calculation formula in the same manner as the area ratio of the Si phase.

$$\text{Area ratio (\%)}=100\times(\text{MSi phase area})/(\text{primary particle area})$$

(3) First Void

The primary particle in the present disclosure includes a first void. The ratio of the first void (first void ratio) is, for example, 3% or more, may be 5% or more, may be 10% or more, and may be 20% or more. Meanwhile, the ratio of the first void is, for example 60% or less, may be 50% or less, may be 40% or less, and may be 30% or less. The ratio of the first void may be obtained from the following calculation formula in the same manner as the area ratio of the Si phase described above.

$$\text{First void ratio (\%)}=100\times(\text{first void area})/(\text{primary particle area})$$

The first void area in the above formula may be, for example, 1 $nm^2$ or more, may be 5 $nm^2$ or more, may be 10 $nm^2$ or more, and may be 100 $nm^2$ or more. Meanwhile, the first void area in the above formula is, for example, 500 $nm^2$ or less, and may be 300 $nm^2$ or less. The first void area may be calculated using image analysis software, for example, as described above.

Also, it is preferable that anode active material in the present disclosure maintains the first void ratio also in the electrode and the battery. This is because expansion may be suppressed also in the electrode and the battery.

The location of the first void in the primary particle is not particularly limited, and may be in the vicinity of the surface of the primary particle, and may be in the vicinity of the center of the primary particle.

(4) Primary Particle

The composition of the primary particle in the present disclosure is not particularly limited as long as it includes the above described elements, phases and first void.

Each of the phases included in the primary particle may be present as a continuous one phase, and may be present as a non-continuous plurality of phases, and the latter is preferable. This is because local expansion of the anode active material may be suppressed. When each of the Si phase, the MSi phase, and the first void exists as a plurality of non-continuous phases, the cross-section of the primary particle may be observed as a pattern wherein the Si phase, the MSi phase, and the first void are dispersed, such as a mottled pattern. In the relationship between the Si phase and the MSi phase, the cross-section of the primary particle may be observed as a sea-island structure wherein the Si phase is the sea and the silicide phase (MSi phase) is the island. In the case of the sea-island structure, the number of MSi phases (islands) in the primary particle may be 10 or more, may be 50 or more, and may be 100 or more. Meanwhile, the number of islands is, for example, 500 or less. Further, the area of the island may be, for example, 1 $nm^2$ or more, may be 5 $nm^2$ or more, may be 10 $nm^2$ or more, and may be 100 $nm^2$ or more. Meanwhile, the area of the island is, for example, 500 $nm^2$ or less, and may be 300 $nm^2$ or less. The first void area may be calculated using image analysis software, for example, as described above.

Further, the primary particle may include only the Si phase, the MSi phase and the first void described above, and may include other phases. Examples of other phases may include a Li phase. The ratio (area ratio) of the other phases in the primary particle is, for example, 5% or less, may be 3% or less, and may be 1% or less.

The average primary particle size of the anode active material is, for example, 50 nm or more, may be 100 nm or more, and may be 150 nm or more. Meanwhile, the average primary particle size of the anode active material is, for example, 3000 nm or less, may be 1500 nm or less, and may be 1000 nm or less. Incidentally, the average primary particle size of the anode active material may be determined, for example, by observation by SEM. The number of samples is preferably large, and is, for example, 20 or more, may be 50 or more, and may be 100 or more. The average primary particle size of the anode active material may be appropriately adjusted, for example, by appropriately changing the production conditions of the anode active material, and performing a classification treatment.

2. Secondary Particle

Also, the anode active material in the present disclosure may be an aggregate of a plurality of the primary particles, and may be a secondary particle including a second void. This is because, when the anode active material is the secondary particle, the expansion of the anode active material layer and the battery may be further suppressed by the void of the primary particle (first void) and the second void of the secondary particle. The second void means a void excluding the void of the primary particle (first void) among voids inside the secondary particle observed when a cross-sectional view of the secondary particle is obtained.

The ratio of the second void (second void ratio) is, for example, 3% or more, may be 5% or more, may be 10% or more, and may be 20% or more. Meanwhile, the second void ratio is, for example, 60% or less, may be 50% or less, may be 40% or less, and may be 30% or less. The second void ratio may be obtained from the following formula in the same manner as the void ratio of the primary particle (first void ratio).

Second Void Ratio (%)=100×(Second Void Area)/ (Secondary Particle Area)

Also, in relation to the thickness (α) of the anode active material layer in the stacking direction described below, the average particle size (β) of the secondary particle is preferably a value that satisfies a predetermined range. β/α is, for example, 0.02 or more, may be 0.1 or more, and may be 0.2 or more. Meanwhile, is, for example, 0.5 or less, may be 0.4 or less, and may be 0.3 or less. The specific range of the average particle size of the secondary particle will be described later.

3. Anode Active Material

The anode active material in the present disclosure comprises the primary particle described above. The anode active material may be a primary particle described above, and may be a secondary particle that is an aggregate of the above described primary particles. Also, it may have a tertiary particle structure including a plurality of domains of the secondary particles.

Examples of the shape of the anode active material in the present disclosure may include a particulate shape. Also, the average secondary particle size (β) of the anode active material in the present disclosure is, for example, 1 μm or more, may be 2 μm or more, may be 5 μm or more, and may be 7 μm or more. Meanwhile, the average secondary particle size of the anode active material is, for example, 60 μm or less, may be 40 μm or less, and particularly preferably 20 μm or less. The measurement and adjustment of the average secondary particle size are the same as those of the primary particle described above.

The anode active material in the present disclosure is usually used for a battery. The battery is described in detail in "B. Battery" described later.

The method for producing an anode active material in the present disclosure is not particularly limited, and examples thereof may include a method including a preparing step of preparing a precursor containing a Si element, a transition metal element, and a Li element, and a Li extracting step of extracting the Li element from the precursor to obtain the above described anode active material.

Preparing step is a step of preparing precursors containing a Si element, a transition metal element, and a Li element. The precursor may be purchased or may be prepared by oneself. Examples of a method for preparing the precursor by oneself may include a method wherein a Si alloy is produced by mixing a Si element source and a transition metal element source, and a Li element source is added to the Si alloy for mixing. The amounts of the Si element and the transition metal element contained in the precursor are not particularly limited as long as the anode active material in the present disclosure may be obtained, and may be appropriately adjusted. Also, the amount of Li element is not particularly limited. The transition metal element is the transition metal element M described above.

The Li extracting step is a step of creating the first void by extracting the Li element from the precursor and obtaining the above described anode active material. Examples of the method for extracting Li may include a method wherein a Li extraction solvent such as ethanol and acetic acid is reacted with a precursor for a predetermined time.

By such a process as described above, the anode active material that is a primary particle may be produced. Also, adjustment of the void ratio in the primary particle may be performed, for example, by changing the amount of Li element in the precursor in preparing step, the type of Li extraction solvent in the Li extracting step, and the reaction time between the Li extraction solvent and the precursor. For example, by increasing the amount of Li element in the precursor, the void ratio may be increased.

The present disclosure may also provide a method for producing an anode active material that is a secondary particle wherein a plurality of the primary particles are aggregated, and a second void is included, the method comprising a preparing step of preparing a micellar solution containing water, a surfactant, a template material, and a polymerization initiator; and a polymerization reaction step of adding the above described primary particle to the micellar solution to cause a polymerization reaction; and a heat treatment step of heat-treating the micellar solution after the polymerization reaction. In such a manner, it is possible to produce an anode active material including a second void inside the secondary particle. Also, an anode active material that is the secondary particle may also be produced, for example, by adding a solvent such as butyl butyrate to a powder material containing the above described primary particle and a binder, and granulating the mixture.

B. Battery

FIG. 1 is a schematic cross-sectional view showing an example of the battery in the present disclosure. Battery 10 shown in FIG. 1 comprises cathode active material layer 1, anode active material layer 2, electrolyte layer 3 formed between cathode active material layer 1 and anode active material layer 2, cathode current collector 4 for collecting current of cathode active material layer 1, anode current collector 5 for collecting current of anode active material layer 2, and battery case 6 for storing these members. In the present disclosure, anode active material layer 2 includes the anode active material described above.

According to the present disclosure, since the anode active material layer includes the above described anode active material, the confining pressure of a battery may be suppressed from being increased by charging and discharging.

1. Anode Active Material Layer

The anode active material layer is a layer including at least the above described anode active material. Since the anode active material is the same as that described in "A. Anode active material" above, description thereof will be omitted here.

As an anode active material, the anode active material layer may include only the above described anode active material, and may include other anode active material. In the latter case, the ratio of the anode active material described above in all the anode active materials may be, for example, 50% by weight or more, may be 70% by weight or more, and may be 90% by weight or more.

The ratio of the anode active material in the anode active material layer is, for example, 20% by weight or more, may be 30% by weight or more, and may be 40% by weight or more. Meanwhile, the ratio of anode active material is, for example, 80% by weight or less, may be 70% by weight or less, and may be 60% by weight or less.

Further, the anode active material layer may further contain at least one of a solid electrolyte, a conductive material, and a binder, if necessary. The type of the solid electrolyte will be described in detail in "3. Electrolyte Layer" later. The ratio of the solid electrolyte in the anode active material layer is, for example, 1% by weight or more, may be 10% by weight or more, and may be 20% by weight or more. Meanwhile, the ratio of the solid electrolyte in the anode active material layer is, for example, 60% by weight or less, and may be 50% by weight or less.

Examples of the conductive material may include a carbon material and metal particles. Specific examples of the carbon material may include particulate carbon materials such as acetylene black (AB) and Ketjen black (KB); and fibrous carbon materials such as carbon fibers, carbon nanotubes (CNTs), carbon nanofibers (CNFs), and vapor-grown carbon fibers (VGCF). Examples of the metal particle may include Ni, Cu, Fe, and SUS. The ratio of the conductive material in the anode active material layer is, for example, 1% by weight or more, and may be 5% by weight or more. Meanwhile, the ratio of the conductive material is, for example, 30% by weight or less, and may be 20% by weight or less.

Examples of the binder may include a rubber based binder such as butadiene rubber, hydrogenated butadiene rubber, styrene butadiene rubber (SBR), hydrogenated styrene butadiene rubber, nitrile butadiene rubber, hydrogenated nitrile butadiene rubber, and ethylene propylene rubber; a fluoride-based binder such as polyvinylidene fluoride (PVDF), polyvinylidene fluoride-polyhexafluoropropylene copolymer (PVDF-HFP), polytetrafluoroethylene, and fluoride rubber; a polyolefin-based thermoplastic resin such as polyethylene, polypropylene, and polystyrene; an imide-based resin such as polyimide, and polyamideimide; an amide-based resin such as polyamide; an acrylic resin such as polymethyl acrylate and polyethyl acrylate; and a methacrylic resin such as polymethyl methacrylate and polyethyl methacrylate. The ratio of the binder in the anode active material layer is, for example, 1% by weight or more and 30% by weight or less.

The thickness of the anode active material layer is, for example, 0.1 μm or more and 1000 μm or less. Also, in the anode active material layer, when the anode active material includes the above described secondary particle, the thickness (a) of the anode active material layer is preferably a value that the above described a satisfies a predetermined range.

2. Cathode Active Material Layer

The cathode active material layer is a layer including at least a cathode active material. Also, the cathode active material layer may further contain at least one of a solid electrolyte, a conductive material, and a binder, if necessary.

Examples of the cathode active material may include an oxide active material. Examples of the oxide active material used for a lithium ion battery may include an oxide active material such as $LiCoO_2$, $LiMnO_2$, $Li_2NiMn_3O_8$, $LiVO_2$, $LiCrO_2$, $LiFePO_4$, $LiCoPO_4$, $LiNiO_2$, and $LiNi_{1/3}CO_{1/3}Mn_{1/3}O_2$. Also, a coating layer including, for example, a Li ion conductive oxide such as $LiNbO_3$ may be formed on the surface of these active materials.

The ratio of the cathode active material in the cathode active material layer is, for example, 20% by weight or more, may be 30% by weight or more, and may be 40% by weight or more. Meanwhile, the ratio of the cathode active material is, for example, 80% by weight or less, may be 70% by weight or less, and may be 60% by weight or less.

Incidentally, the type and the ratio of the solid electrolyte, the conductive material, and the binder used for the cathode active material layer are the same as those described in "1. Anode active material layer" above, and description thereof will be omitted here.

The thickness of the cathode active material layer is, for example, 0.1 μm or more and 1000 μm or less.

3. Electrolyte Layer

The electrolyte layer is a layer formed between the cathode active material layer and the anode active material layer. The electrolyte forming the electrolyte layer may be a liquid electrolyte (electrolyte solution), and may be a solid electrolyte, and the latter is preferable.

Typical examples of solid electrolyte may include an inorganic solid electrolyte such as sulfide solid electrolyte, oxide solid electrolyte, nitride solid electrolyte, and halide solid electrolyte; and an organic polymer electrolyte such as polymer electrolyte.

Examples of the sulfide solid electrolyte having lithium ion conductivity may include a solid electrolyte containing a Li element, an X element (X is at least one kind of P, As, Sb, Si, Ge, Sn, B, Al, Ga, and In), and a S element. Also, the sulfide solid electrolyte may further contain at least one of an O element and a halogen element. Examples of the halogen element may include a F element, a Cl element, a Br element, and an I element.

Examples of the sulfide solid electrolyte may include $Li_2S-P_2S_5$, $Li_2S-P_2S_5-LiI$, $Li_2S-P_2S_5-GeS_2$, $Li_2S-P_2S_5-Li_2O$, $Li_2S-P_2S_5-Li_2O-LiI$, $Li_2S-P_2S_5-LiI-LiBr$, $Li_2S-SiS_2$, $Li_2S-SiS_2-LiI$, $Li_2S-SiS_2-LiBr$, $Li_2S-SiS_2-LiCl$, $Li_2S-SiS_2-B_2S_3-LiI$, $Li_2S-SiS_2-P_2S_5-LiI$, $Li_2S-B_2S_3$, $Li_2S-P_2S_5$-ZmSn (where m and n are positive numbers; Z is any one of Ge, Zn, and Ga), and $Li_2S-GeS_2$, $Li_2S-SiS_2-Li_3PO_4$, $Li_2S-SiS_2-Li_xMO_y$, (where x and y are positive numbers; M is any one of P, Si, Ge, B, Al, Ga, and In).

Also, examples of the oxide solid electrolyte having lithium ion conductivity may include a solid electrolyte containing a Li element, a Y element (Y is at least one kind of Nb, B, Al, Si, P, Ti, Zr, Mo, W, and S), and an O element. Specific examples may include: a garnet-type solid electrolyte such as $Li_7La_3Zr_2O_{12}$, $Li_{7-x}La_3(Zr_{2-x}Nb_x)O_{12}$ (0≤x≤2), $Li_5La_3Nb_2O_{12}$; a perovskite-type solid electrolyte such as (Li, La)$TiO_3$, (Li, La)$NbO_3$, (Li, Sr)(Ta, Zr)$O_3$; a Nashicon-type solid electrolyte such as Li(Al, Ti)(PO$_4$)$_3$, Li(Al, Ga)(PO$_4$)$_3$; a Li—P—O based solid electrolyte such as $Li_3PO_4$, LIPON (a compound wherein a part of O in $Li_3PO_4$ is substituted with N); a Li—B—O based solid electrolyte such as $Li_3BO_3$, and a compound wherein a part of O in $Li_3BO_3$ is substituted with C.

The binder may the same as those described in "1. Anode active material layer" above, and description thereof will be omitted here.

4. Other Constitutions

The battery in the present disclosure comprises at least the anode active material layer, the cathode active material layer and the electrolyte layer described above. Also, it usually comprises a cathode current collector for collecting a current of the cathode active material layer and an anode current collector for collecting a current of the anode active material layer. Examples of a material for the cathode current collector may include SUS, aluminum, nickel, iron, titanium and carbon. Meanwhile, examples of a material for the anode current collector may include SUS, copper, nickel and carbon.

Also, the battery in the present disclosure may further comprise a confining jig that imparts a confining pressure along the thickness direction to the cathode active material layer, the electrolyte layer, and the anode active material layer. As the confining jig, a known jig may be used. The confining pressure is, for example, 0.1 MPa or more, may be 1 MPa or more, and may be 5 MPa or more. Meanwhile, the confining pressure is, for example, 100 MPa or less, may be 50 MPa or less, and may be 20 MPa or less.

5. Battery

The battery in the present disclosure is preferably a lithium ion battery. Also, the battery in the present disclosure may be a liquid based battery, may be an all solid state battery, and the latter is preferable. This is because it is possible to further enjoy the effect of suppressing an increase in the confining pressure due to charging and discharging in the present disclosure.

Also, the battery in the present disclosure may be a primary battery, and may be a secondary battery; among them, a secondary battery is preferable. This is because it may be charged and discharged repeatedly, and it is useful, for example, as an in-vehicle battery. The secondary battery also includes the primary battery use of the secondary battery (use intended for the initial charge only).

Also, the battery in the present disclosure may be a single-cell battery, and may be a stacked battery. The stacked battery may be a monopolar type stacked battery (stacked battery of the parallel connection type), and may be a bipolar type stacked battery (stacked battery of the series connection type). Examples of the shape of the battery may include a coin shape, a laminated shape, a cylindrical shape, and a square shape.

Incidentally, the present disclosure is not limited to the embodiments. The embodiments are exemplification, and any other variations are intended to be included in the technical scope of the present disclosure if they have substantially the same constitution as the technical idea described in the claim of the present disclosure and offer similar operation and effect thereto.

EXAMPLES

Example 1

<Synthesis of Anode Active Material (Primary Particle)>
(1) Preparation of Silicide An ingot was prepared by argon arc melting by mixing 2 mm to 5 mm agglomerates of Si (from Kojundo Chemical Lab. Co., Ltd.) and 2 mm to 5 mm agglomerates of transition metal (Cr). Incidentally, for the ratio of the Si element and the Cr element, X in (100–X)Si–(X)M shown in Table 1 below was 2. The ingot was crushed in a tungsten mortar, and further crushed in a ball mill to produce Si alloy powder (silicide).

(2) Preparation of Porous Silicide (Anode Active Material)

To 0.65 g weight of Si contained in the produced Si alloy powder, 0.60 g of metal Li (from Honjo Metal Co., Ltd.) was added. Then, LiSi precursor was obtained by mixing them under an Ar atmosphere in an agate mortar. To 1.0 g of the obtained LiSi precursor, 250 ml of ethanol (from Nacalai Tesque Co., Ltd.) at 0° C. was added, and the mixture was reacted in a glass reactor under an Ar atmosphere for 120 minutes. Thereafter, liquid was separated from solid reactant A by suction filtration to recover solid reactant A. To 0.5 g of the recovered solid reactant A, 50 ml of acetic acid (from Nacalai Tesque Co., Ltd.) was added, and the mixture was reacted in a glass reactor in an atmosphere for 60 minutes. Thereafter, liquid was separated from solid reactant B by suction filtration to recover solid reactant B. Solid reactant B was vacuum-dried at 100° C. for 2 hours to produce a porous silicide (anode active material).

<Preparation of Evaluation Battery>

As a solid electrolyte, 0.7 g of 0.75$Li_2S$–0.25$P_2S_5$, 0.6 g of the anode active material whose average particle size (average primary particle size) was adjusted to 3 μm, 0.06 g of VGCF as a conductive material, and 0.24 g of butyl butyrate solution containing 5% by weight of PVDF based resin as a binder were added to a polypropylene container. This container was subjected to ultrasonic treatment for 30 seconds in an ultrasonic dispersion apparatus, and then, subjected to shaking treatment using a shaker for 30 minutes to obtain an anode mixture. A current collector (copper foil) was coated with the obtained anode mixture by a blade method using an applicator, and naturally dried for 60 minutes. The anode precursor thus obtained was dried for 30 minutes on a hot plate adjusted to 100° C. to produce an anode.

As a solid electrolyte, 0.3 g of 0.75$Li_2S$–0.25$P_2S_5$, 2 g of $LiNi_{1/3}Co_{1/3}Mn_{1/3}O_2$ as a cathode active material, a 0.03 g of VGCF as a conductive material, and 0.3 g of a butyl butyrate solution containing 5% by weight of a PVDF based resin as a binder were added to a polypropylene container. This container was subjected to ultrasonic treatment for 30 seconds in an ultrasonic dispersion apparatus, and then, subjected to shaking treatment using a shaker for 30 minutes to obtain a cathode mixture. A current collector (aluminum foil) was coated with the obtained cathode mixture by a blade method using an applicator, and naturally dried for 60 minutes. The cathode precursor thus obtained was dried for 30 minutes on a hot plate adjusted to 100° C. to produce a cathode.

As a solid electrolyte, 0.4 g of 0.75Li$_2$S–0.25P$_2$S$_5$ with an average particle size of 2 μm, and 0.05 g of a heptane solution containing 5% by weight of an ABR based resin as a binder were added to a polypropylene container. This container was subjected to ultrasonic treatment for 30 seconds in an ultrasonic dispersion apparatus, and then, subjected to shaking treatment for 30 minutes using a shaker to obtain a paste. A substrate (aluminum foil) was coated with the obtained paste by a blade method using an applicator, and dried on a hot plate adjusted to 100° C. for 30 minutes to prepare a solid electrolyte layer.

The anode, the solid electrolyte layer, and the cathode obtained as described above were stacked so as to be in contact with each other in this order. With respect to the stack, a pressure of 200 MPa was applied at 130° C. for 3 minutes, to prepare an evaluation battery (all solid state battery).

Examples 2 to 6

The amount of Cr was changed so that the ratio of the transition metal element in the anode active material was the value shown in Table 1. Also, the Li content in the above "(2) Preparation of porous silicide (anode active material)" was adjusted to be the value of the first void ratio in Table 1. An evaluation battery was obtained in the same manner as in Example 1, except for these matters.

Comparative Example 1

An evaluation battery was obtained in the same manner as in Example 1, except that a Si particle was used as the anode active material.

Comparative Example 2

An evaluation battery was obtained in the same manner as in Example 1, except that "(1) Preparation of silicide" in Example 1 was not carried out, and only "(2) Preparation of porous silicide (anode active material)" was carried out.

Comparative Example 3

An evaluation battery was obtained in the same manner as in Example 1, except that "(2) Preparation of porous silicide (anode active material)" in Example 1 was not carried out, and only "(1) Preparation of silicide" was carried out.

Comparative Example 4

An anode active material was prepared according to the process disclosed in Patent Literature 2 (JP-A No. 2015-095301). An evaluation battery was obtained in the same manner as in Example 1, except that this anode active material was used. Incidentally, the transition metal element contained in the silicide phase was the same as in Example 1.

Comparative Examples 5 and 6

The amount of Cr was changed so as the ratio of the transition metal element in the anode active material to be 50 mol %. The Li amount in the above "(2) Preparation of porous silicide (anode active material)" was adjusted to be the value of the first void ratio in Table 1. An evaluation battery was obtained in the same manner as in Example 1, except for these matters.

[Evaluation 1]
<First Void Ratio>

Cross-sectional SEM images of the anode active materials (anode active material prior to preparation of the evaluation battery) prepared in Examples 1 to 6 and Comparative Examples 1 to 6 were obtained. Based on the obtained SEM image, the first void ratio was calculated from the following formula. Each void ratio is shown in Table 1. The primary particle images in Example 4 and Comparative Example 4 are shown in FIGS. 2 and 3.

$$\text{First void ratio (\%)} = 100 \times (\text{first void area})/(\text{primary particle area})$$

Figure 2:
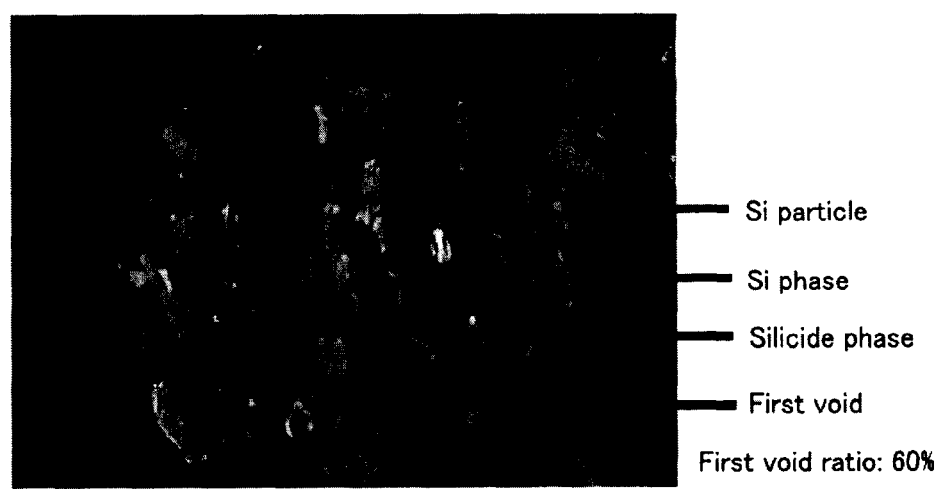
FIG. 2 is a cross-sectional SEM image of the anode active material (primary particle) obtained in Example 4.
Figure 3:
FIG. 3 is a cross-sectional SEM image of the anode active material (primary particle) obtained in Comparative Example 4.

As shown in FIG. 2, in the anode active material (Example 4) in the present disclosure, it was confirmed that it comprised an Si phase, an MSi phase, and a first void inside the primary particle. Also, as shown in FIG. 2, the Si phase, the MSi phase, and the first void existed as a plurality of non-continuous phases respectively, and the cross-section of the anode active material was a mottled pattern. Meanwhile, as shown in FIG. 3, in Comparative Example 4, the first void was not confirmed at all.

<Confining Pressure Increase>

Each evaluation battery prepared in Examples 1 to 6 and Comparative Examples 1 to 6, was confined at a predetermined pressure, was energized at a constant current to a predetermined voltage at 0.1 C for the first charge. On the first charge, the confining pressure of the battery was monitored and the confining pressure in state of charge was measured. The amount of increase in the confining pressure was relatively evaluated by setting the value in Comparative Example 1 as 1.00. The results are shown in Table 1.

<Resistance>

Resistances at 25° C. and 60% SOC (State of Charge) were determined for the respective evaluation battery prepared in Examples 1 to 6 and Comparative Examples 1 to 6. Specifically, after charging at 0.245 mA to a voltage of 3.7 V, the battery was discharged for 5 seconds at 7.35 mA, to calculate the internal resistance from the change in voltage. The resistance was relatively evaluated by setting the value in Comparative Example 1 as 1.00. The results are shown in Table 1.

TABLE 1

| | (100 − X) Si − (X) M | | | |
| --- | --- | --- | --- | --- |
| Si − M | X (mol %) | First void ratio (%) | Confining pressure increase | Resistance |
| Comp. Ex. 1 | 0 | 0 | 1.00 | 1.00 |
| Comp. Ex. 2 | 0 | 18 | 0.98 | 1.25 |
| Comp. Ex. 3 | 2 | 0 | 1.00 | 0.95 |
| Comp. Ex. 4 | 10 | 0 | 1.00 | 0.85 |
| Example 1 | 2 | 11 | 0.87 | 1.09 |
| Example 2 | 10 | 3 | 0.95 | 0.93 |

TABLE 1-continued

| | (100 − X) Si − (X) M | | | |
|---|---|---|---|---|
| Si − M | X (mol %) | First void ratio (%) | Confining pressure increase | Resistance |
| Example 3 | 10 | 22 | 0.72 | 1.08 |
| Example 4 | 10 | 60 | 0.52 | 1.15 |
| Example 5 | 30 | 5 | 0.92 | 1.02 |
| Example 6 | 30 | 48 | 0.58 | 1.13 |
| Comp. Ex. 5 | 50 | 5 | 0.95 | 1.15 |
| Comp. Ex. 6 | 50 | 50 | 0.54 | 1.30 |

As shown in Table 1, in Comparative Example 2 including the first void without the presence of the MSi phase (silicide phase), the increase in the confining pressure was not suppressed, and the resistance was also high. The reason therefore is believed that the first void was collapsed in the pressing step at the time of preparing the electrode because the silicide phase was not present. In Comparative Examples 3 and 4, wherein the Si phase and the silicide phase were present and the first void was not present, cracking occurred at the interface between the silicide phase and the Si phase at the time of charging, and the increase in the confining pressure could not be suppressed.

Meanwhile, in the evaluation battery (Examples 1 to 6) using the anode active material (primary particle) in the present disclosure, the increase in the confining pressure was remarkably suppressed. The reason therefore is believed that the silicide phase acted as a pillar so that the first void could be maintained. As can be seen from Comparative Example 2, the resistance generally tends to increase when the first void is provided. However, since the silicide phase has electronic conductivity, it was possible to suppress the increase in resistance in the evaluation battery in Examples 1 to 6. In Comparative Examples 5 and 6 wherein the ratio of the transition metal element was 50 mol %, only the silicide phase was formed, and the Si phase was not formed.

From the above, it was confirmed that, since the volume variation due to charging and discharging of the anode active material (primary particle) in the present disclosure was small, the increase of the confining pressure may be suppressed in the battery using this anode active material.

Example 7

<Synthesis of Anode Active Material (Secondary Particle)>

A micellar solution was prepared by heating a solution obtained by mixing water, a surfactant (hexadecyltrimethylammonium bromide), a template material (styrene), and a polymerization initiator (2,2'-azobis(2,4-dimethylvaleronitrile)). Then, to the micellar solution, the primary particle prepared in Example 4 (first void ratio: 60%) and an organic solvent (octane) were added to react (polymerization reaction) for 3 hours. The polymerization reaction was terminated by cooling. Then, by performing a heat treatment at 500° C., a secondary particle wherein primary particles were aggregated, was prepared. Average particle size of the secondary particle was adjusted as appropriate so that the ratio ($\beta/\alpha$) of the average particle size of the secondary particle to the thickness of the anode active material layer in the stacked direction was the value shown in Table 2. Also, the secondary particle produced by such a method includes a void (second void) inside.

<Preparation of Battery>

Using the above secondary particle as the anode active material, the average particle size of the secondary particle and the thickness of the anode active material layer were adjusted so that the ratio ($\beta/\alpha$) of the average particle size of the secondary particle ($\beta$) to the thickness of the anode active material layer in the stacked direction ($\alpha$) was the value shown in Table 2. An evaluation battery was obtained in the same manner as in Example 1, except for the above matters.

Examples 8 to 11

The average particle size of the secondary particle and the thickness of the anode active material layer were adjusted so that $\beta/\alpha$ was the value shown in Table 2. An evaluation battery was obtained in the same manner as in Example 7, except for the above matters.

Evaluation 2

<Confining Pressure Increase>

The amount of confining pressure increase of the respective evaluation battery prepared in Examples 7 to 11 was measured in the same manner as in Evaluation 1. The amount of increase in the confining pressure was relatively evaluated by setting the value in Example 7 as 1.00. The results are shown in Table 2.

<Resistance>

The resistance of the respective evaluation battery prepared in Examples 7 to 11 were calculated in the same manner as in Evaluation 1. The resistance was relatively evaluated by setting the value in Example 7 as 1.00. The results are shown in Table 2.

TABLE 2

| | | (100 − X) Si − (X) M | | | |
|---|---|---|---|---|---|
| Si − M | $\beta/\alpha$ | X (mol %) | First void ratio (%) | Confining pressure increase | Resistance |
| Example 7 | 0.02 | 10 | 60 | 1.00 | 1.00 |
| Example 8 | 0.1325 | 10 | 60 | 0.92 | 1.01 |
| Example 9 | 0.3 | 10 | 60 | 0.88 | 1.03 |
| Example 10 | 0.5 | 10 | 60 | 0.52 | 1.05 |
| Example 11 | 0.61 | 10 | 60 | 0.51 | 1.20 |

As shown in Table 2, as $\beta/\alpha$ increased, the amount of increase in the confining pressure was decreased. The reason therefore is believed that the average particle size of the secondary particle became relatively large, so that the voids between the secondary particles in the anode active material layer became large, and the expansion of the anode active material could be absorbed. Meanwhile, when $\beta/\alpha$ became too large, the battery resistance increased rapidly. The reason therefore is believed that the void between the secondary particles became relatively too large, and the Li ion conductivity between the secondary particles was lowered. From the above, it is believed that $\beta/\alpha$ is preferably 0.02 or more and 0.5 or less in a battery, in view of the suppressing effects of the increase in the confining pressure and the increase in the resistivity.

<Mechanical Strength of Silicide>

Figure 4:
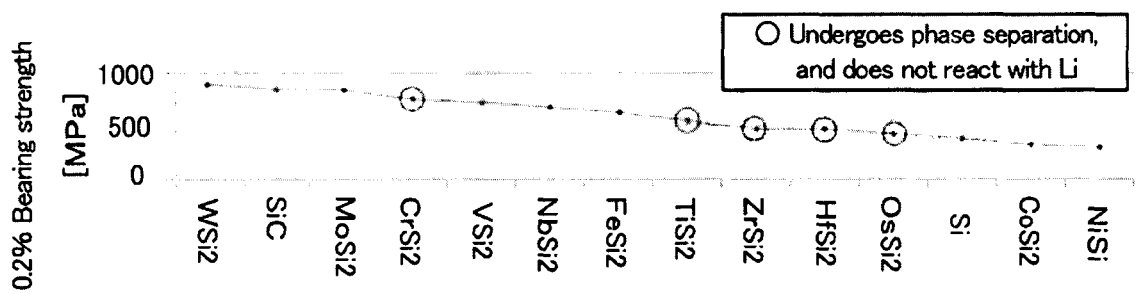
FIG. 4 is a graph showing the mechanical strength determined by a Phase-Field method.

The mechanical strengths of Si and various silicides were calculated from simulations by Phase-Field method. The results are shown in FIG. 4. Incidentally, the silicide shown with a circle in the figure is a silicide which undergoes phase separation and does not react with Li. It is considered that the silicide with the mechanical strength higher than silicon (Si) may sufficiently play a role as a pillar in the primary particle. Also, it is considered that a silicide which undergoes phase separation and does not react with Li tends to maintain the structure as a pillar.

REFERENCE SIGNS LIST

1: cathode active material layer
2: electrolyte layer
3: anode active material layer
4: cathode current collector
5: anode current collector
6: battery case
10: battery

What is claimed is:

1. A battery comprising a cathode active material layer, an anode active material layer, and an electrolyte layer formed between the cathode active material layer and the anode active material layer, wherein
the anode active material layer includes an anode active material,
the anode active material comprises a primary particle including a Si phase, a MSi phase that is a silicide phase wherein M is a transition metal element, and a first void,
a cross-section of the primary particle comprises a sea-island structure wherein the Si phase is the sea and the silicide phase (MSi phase) is the island,
the transition metal element is at least one selected from the group consisting of Cr, Ti, Zr, Hf, and Os,
the anode active material is an aggregate of a plurality of primary particles, and is a secondary particle including a second void, and
when a thickness of the anode active material layer in a stacked direction is a $\alpha$ μm, and an average particle size of the secondary particle is $\beta$ μm, $\beta/\alpha$ is 0.02 or more and 0.5 or less, determined by SEM.

2. The battery according to claim 1, wherein a ratio of the transition metal element to a sum of a Si element and the transition metal element included in the primary particle is 2 mol % or more and less than 50 mol %.

3. The battery according to claim 1, wherein the primary particle has a first void ratio, wherein the first void ratio is a percentage determined by 100×(first void area)/(primary particle area), of 3% or more.

4. The battery according to claim 1, wherein the transition metal element is Cr.

5. The battery according to claim 1, wherein $\beta/\alpha$ is 0.02 or more and 0.3 or less.

6. The battery according to claim 1, wherein a ratio of the transition metal element to a sum of a Si element and the transition metal element included in the primary particle is 5 mol % or more and 40 mol % or less.

7. The battery according to claim 1, wherein a ratio of the first void in the primary particle is 20% or more and 60% or less.

* * * * *